(12) United States Patent  
Luman

(10) Patent No.: US 6,476,845 B2
(45) Date of Patent: Nov. 5, 2002

(54) ELECTROPHOTOGRAPHIC PRINTER, AND METHOD OF CONTROLLING LIGHT EMITTING ELEMENTS IN AN ELECTROPHOTOGRAPHIC PRINT HEAD

(75) Inventor: David J. Luman, Meridian, ID (US)

(73) Assignee: Hewlett-Packard Co., Palo Alto, CA (US)

(*) Notice: Subject to any disclaimer, the term of this patent is extended or adjusted under 35 U.S.C. 154(b) by 14 days.

(21) Appl. No.: 09/737,429

(22) Filed: Dec. 13, 2000

(65) Prior Publication Data

US 2002/0071024 A1 Jun. 13, 2002

(51) Int. Cl.[7] ............................................. B41J 2/435
(52) U.S. Cl. ...................................................... 347/237
(58) Field of Search ................................. 347/237, 238, 347/239, 247, 252, 253, 255

(56) References Cited

U.S. PATENT DOCUMENTS

| | | | |
|---|---|---|---|
| 3,850,517 A | 11/1974 | Stephany et al. | 396/551 |
| 4,525,729 A | 6/1985 | Agulnek et al. | 347/237 |
| 4,689,694 A | 8/1987 | Yoshida | 358/298 |
| 4,706,130 A | 11/1987 | Yamakawa | 358/296 |
| 4,780,731 A | 10/1988 | Creutzmann et al. | 492/16 |
| 4,831,395 A | 5/1989 | Pham et al. | 347/237 |
| 4,897,672 A | 1/1990 | Horiuchi et al. | 347/236 |
| 4,982,203 A | 1/1991 | Uebbing et al. | 347/236 |
| 5,025,322 A | 6/1991 | Ng | 347/236 |
| 5,126,759 A | 6/1992 | Small et al. | 347/237 |
| 5,134,495 A | 7/1992 | Frazier et al. | 358/298 |
| 5,138,337 A | 8/1992 | Ng | 347/237 |
| 5,193,008 A | 3/1993 | Frazier et al. | 358/298 |
| 5,250,963 A | 10/1993 | Smith et al. | 347/130 |
| 5,515,480 A | 5/1996 | Frazier | 358/1.9 |
| 5,648,810 A | 7/1997 | Tanuma et al. | 347/130 |
| 5,666,150 A | 9/1997 | Ajewole | 347/240 |
| 5,668,587 A | 9/1997 | Hammond et al. | 347/237 |
| 5,680,167 A | 10/1997 | Willis | 347/115 |
| 5,739,841 A | 4/1998 | Ng et al. | 347/237 |
| 5,751,328 A | 5/1998 | Tanuma et al. | 347/130 |
| 5,825,399 A | 10/1998 | Orlicki et al. | 347/237 |
| 5,892,532 A | 4/1999 | Katakura et al. | 347/240 |
| 6,011,575 A | 1/2000 | Haneda | 347/238 |
| 6,049,349 A | 4/2000 | Tanuma et al. | 347/240 |
| 6,052,136 A | 4/2000 | Tanioka et al. | 347/118 |
| 6,121,993 A * | 9/2000 | Maekawara et al. | 347/236 |
| 6,397,186 B1 * | 5/2002 | Bush et al. | 704/274 |

FOREIGN PATENT DOCUMENTS

WO 94/04994 * 3/1994

* cited by examiner

Primary Examiner—Michael Nghiem

(57) ABSTRACT

A method of controlling light emitting elements in an electrophotographic print head includes providing a predetermined number of pulse width modulators having different width output pulses, the predetermined number being less than the number of light emitting elements; selecting multiple light emitting elements for coupling to respective ones of the pulse width modulators; and coupling the multiple selected light emitting elements to the respective pulse width modulators. An electrophotographic printer includes a print head having a predetermined number of light emitting elements; a predetermined number of pulse width modulators having different width output pulses, the predetermined number being less than the number of light emitting elements; and logic circuitry configured to couple multiple light emitting elements to respective ones of the pulse width modulators.

16 Claims, 4 Drawing Sheets

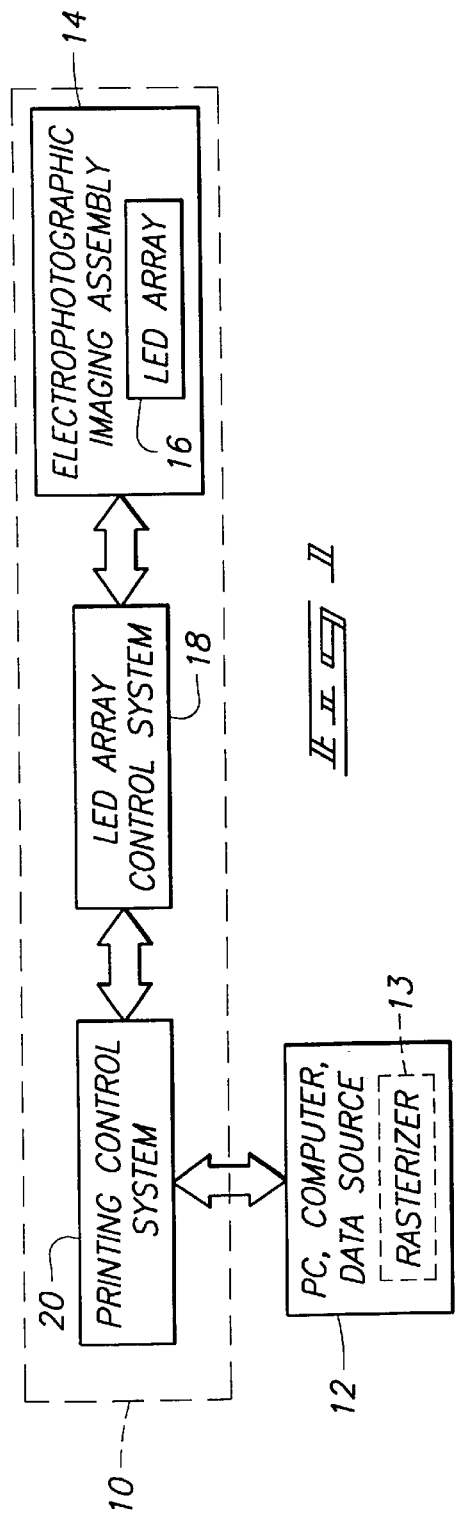
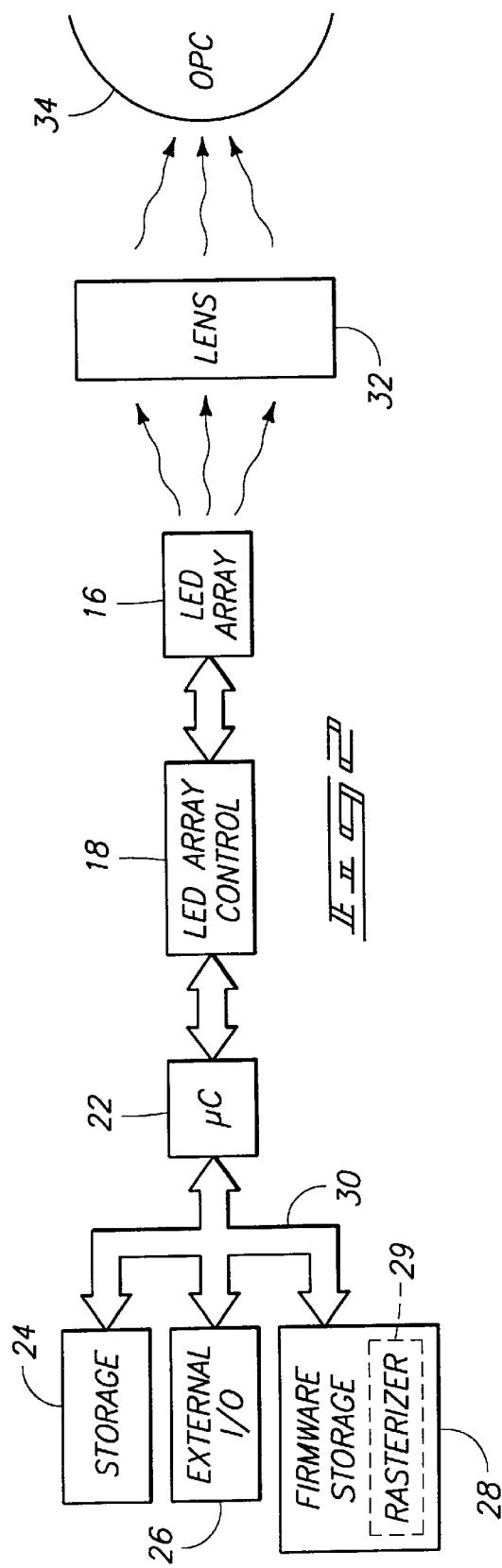

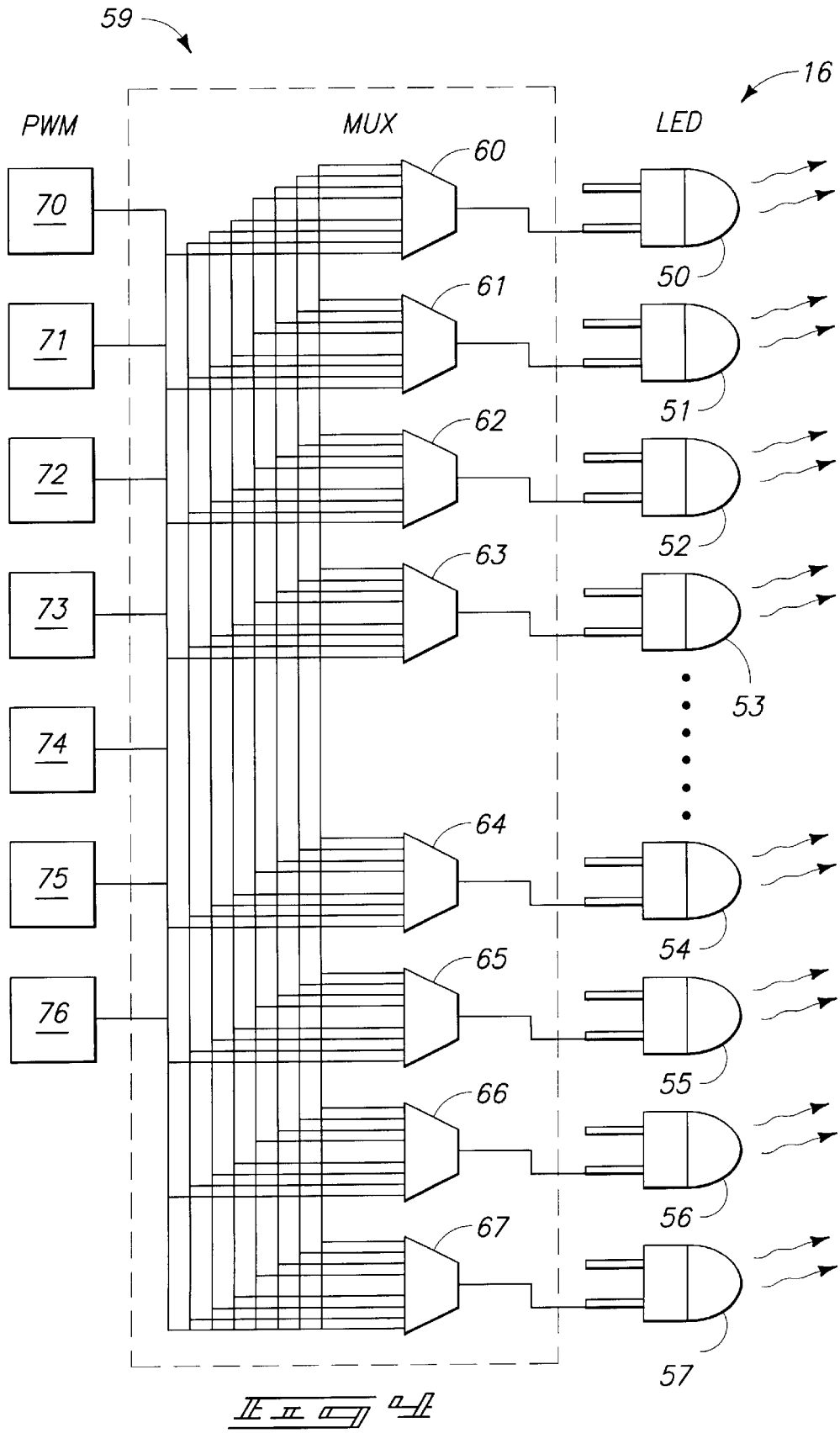

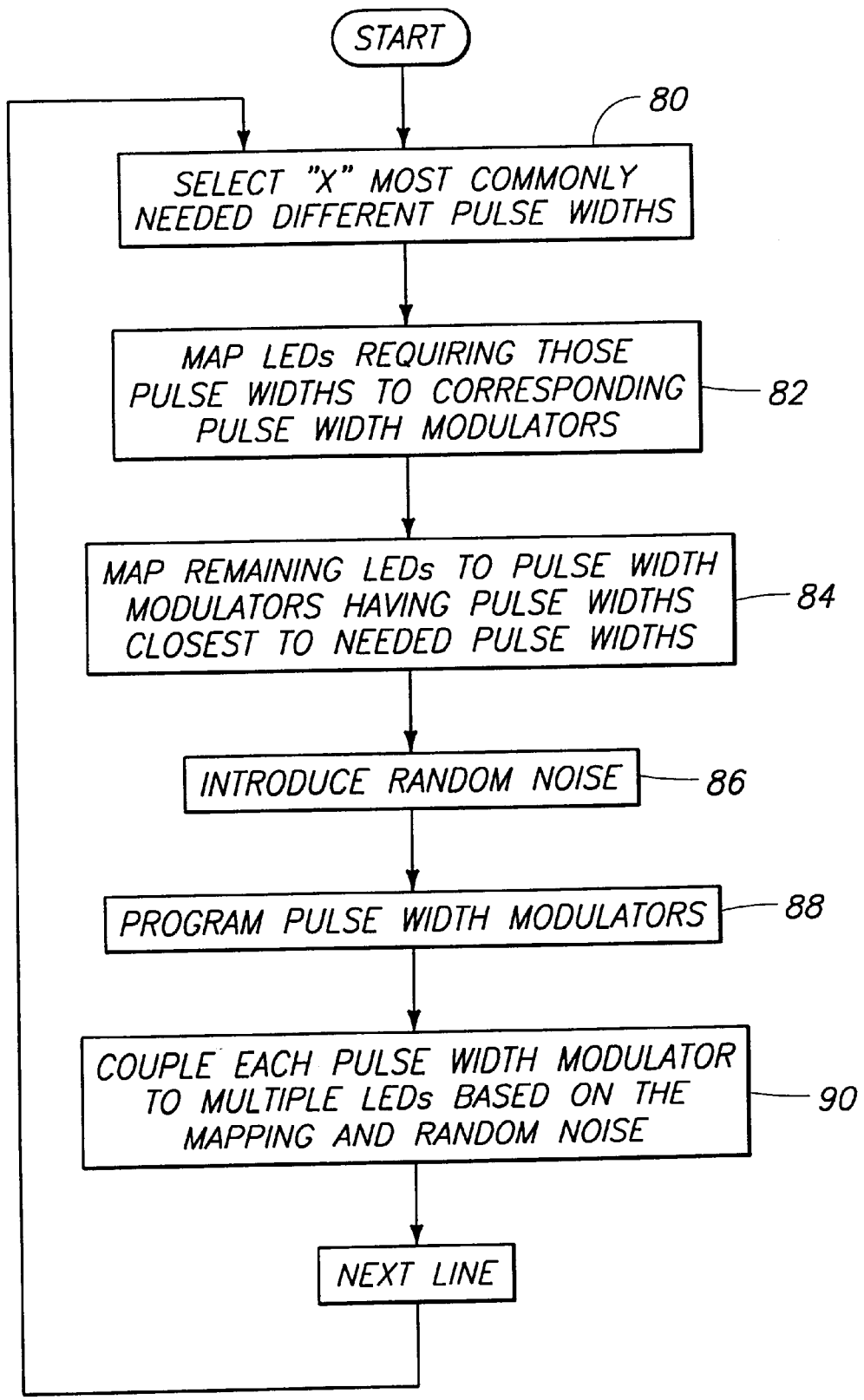

ELECTROPHOTOGRAPHIC PRINTER, AND METHOD OF CONTROLLING LIGHT EMITTING ELEMENTS IN AN ELECTROPHOTOGRAPHIC PRINT HEAD

FIELD OF THE INVENTION

The invention relates to image forming devices, such as printers. More particularly, the invention relates to electrophotographic printers including print arrays made up of light emitting elements. The invention also relates to methods and apparatus for compensating for variation in output between light emitting elements in a print array made up of light emitting elements.

BACKGROUND OF THE INVENTION

Light emitting diode (LED) printbars or print arrays are commonly used in printers because of their high resolution and low cost. They include a large number of closely spaced LEDs arranged in a linear array. An electrostatic image is produced on a recording member by providing relative motion between the LED printbar and a photoreceptor and by selectively providing power to the LEDs at appropriate times. The production of images is performed by having each LED expose a corresponding pixel on the recording member in response to data applied to the printbar through driver circuitry.

Digital data is received from a data source, such as a Raster Input Scanner (RIS), a computer, or a word processor. The digital data is clocked into a shift register. After the start of a line signal, individual LED drive circuits are turned on and off to control the LEDs. The LEDs turned on and off form a line exposure pattern on the surface of the photoreceptor. An image is completed by successive line exposures. Attention is directed to the following U.S. patents, which disclose prior art printhead control circuitry, and which are incorporated herein by reference: U.S. Pat. No. 4,689,694 to Yoshida; U.S. Pat. No. 4,706,130 to Yamakawa; U.S. Pat. No. 5,126,759 to Small et al.; and U.S. Pat. No. 5,138,337 to Ng. Attention is also directed to the following U.S. patents, which disclose prior art exposure control systems, and which are incorporated herein by reference: U.S. Pat. No. 4,525,729 to Agulnek et al., and U.S. Pat. No. 5,025,322 to Ng.

Because the output of each individual LED may vary from that of its neighbors, it is common to compensate for that variation. One method of compensating for variation involves coupling a pulse width modulator (PWM) to each LED. The LEDs are calibrated to produce a uniform output by adjusting the length of the output pulse they produce using the pulse width modulator for each LED. After the LED array has been calibrated, to print a line, signals are sent to the appropriate pulse width modulators to send pulses to their connected LEDs. Different pulse widths are used with different LEDs to compensate for the variation. Other, less accurate, but also less expensive, LED arrays omit the pulse width modulators and drive the LEDs directly. Various systems and methods for achieving LED print bar uniformity are known in the art. Attention is directed to the following U.S. patents, which are incorporated herein by reference: U.S. Pat. No. 5,892,532 to Katakura et al.; U.S. Pat. No. 5,825,399 to Orlicki et al.; U.S. Pat. No. 5,668,587 to Hammond et al.; U.S. Pat. No. 5,666,150 to Ajewole; U.S. Pat. No. 5,250,963 to Smith et al.; U.S. Pat. No. 5,025,322 to Ng; U.S. Pat. No. 4,897,672 to Horiuchi et al.; U.S. Pat. No. 4,831,395 to Pham et al. These patents also provide background information about LED printer hardware. Such hardware could be employed in various alternative embodiments of the apparatus described in the following Detailed Description.

It is also known to use pulse width modulators to enhance resolution in laser printers. See, for example, U.S. Pat. No. 5,134,495 to Frazier et al.; U.S. Pat. No. 5,193,008 to Frazier et al.; and U.S. Pat. No. 5,515,480 to Frazier, all of which are incorporated herein by reference.

LED printers that print with resolutions exceeding LED head resolution are disclosed in U.S. Pat. Nos. 5,648,810; 6,049,349; and 5,751,328 all to Tanuma et al. and all of which are incorporated by reference. These patents disclose setting drive energies for printing drive signals, the drive energies including a first drive energy which is set for actuating LEDs selected in accordance with a first correction output data for printing on basic raster lines and a second drive energy which is set for actuating LEDs selected in accordance with second correction output data for printing on sub-raster lines.

SUMMARY OF THE INVENTION

The invention provides a method and apparatus for controlling the outputs of light emitting elements, such as LEDs, in an electrophotographic print array. A predetermined number of pulse width modulators having different width output pulses are used with a greater number of light emitting elements. The pulse width modulators are used, for example, to enhance resolution or so the light emitting elements will produce generally uniform outputs. A multiplexer or logic circuitry is used to select pulse width modulators to be coupled to LEDs.

One aspect of the invention provides a method of controlling light emitting elements in an electrophotographic print head, comprising providing a predetermined number of pulse width modulators having different width output pulses, the predetermined number being less than the number of light emitting elements; selecting multiple light emitting elements for coupling to respective ones of the pulse width modulators; and coupling the multiple selected light emitting elements to the respective pulse width modulators.

Another aspect of the invention provides an electrophotographic printer comprising a print head having a predetermined number of light emitting elements; a predetermined number of pulse width modulators having different width output pulses, the predetermined number being less than the number of light emitting elements; and logic circuitry configured to couple multiple light emitting elements to respective ones of the pulse width modulators.

Other features and advantages of the invention will become apparent to those of ordinary skill in the art upon review of the following detailed description, claims, and drawings.

DESCRIPTION OF THE DRAWINGS

FIG. 1 is a circuit block diagram of exemplary electrophotographic printer coupled to a computer or other data source.

FIG. 3 is a block diagram of the hardware of the printer of FIG. 1.

FIG. 4 is a block diagram illustrating the interconnection of control electronics and the printhead in accordance with one embodiment of the present invention.

FIG. 5 is a flowchart illustrating steps added to a standard rasterization process, in one embodiment of the invention.

DETAILED DESCRIPTION OF PREFERRED EMBODIMENTS

Figure 2:
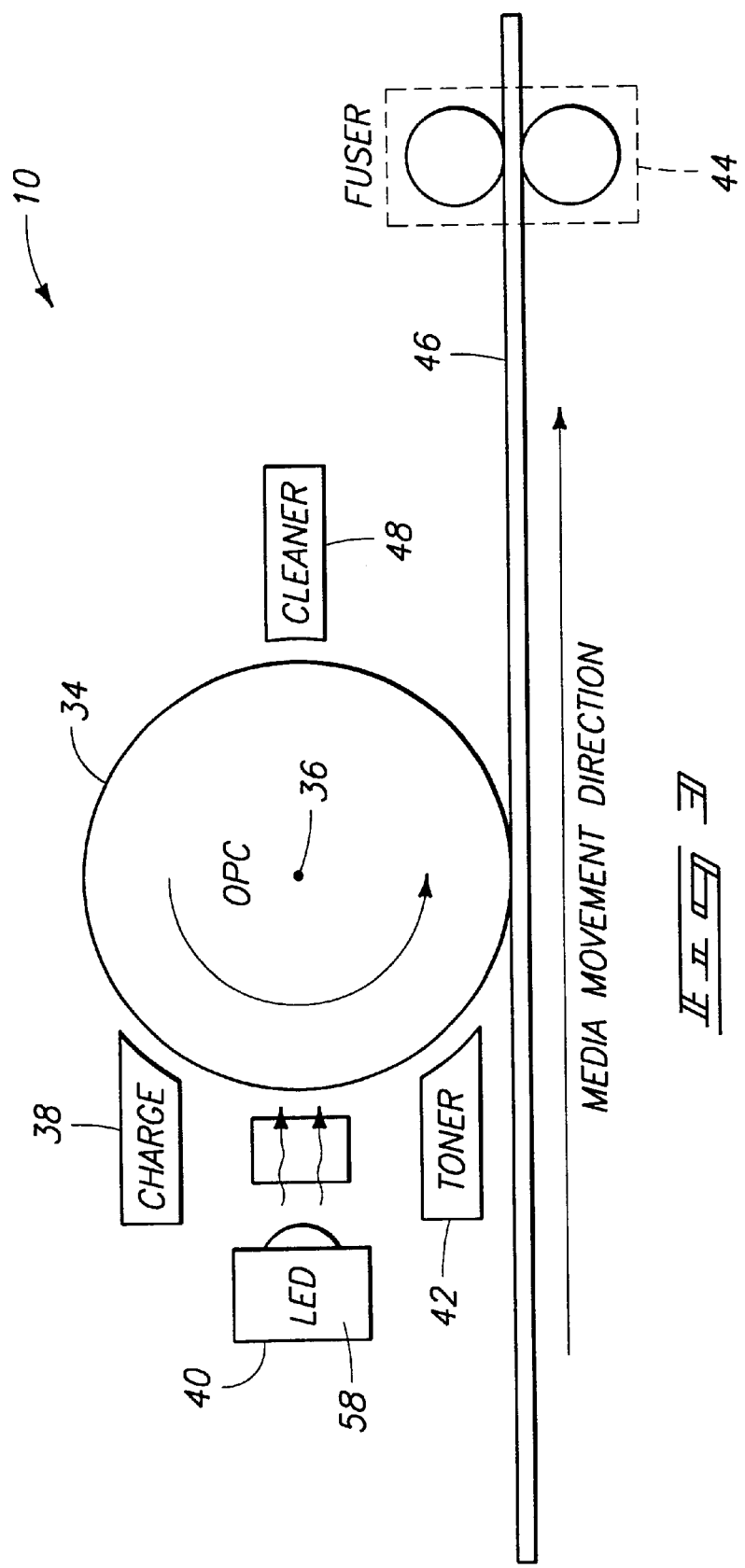
FIG. 2 is an enlargement of the printer of the block diagram shown in FIG. 1.

FIG. 1 shows a circuit block diagram of an exemplary electrophotographic printer 10 coupled to a computer or other data source 12. The printer 10 includes an electrophotographic imaging assembly 14 defined, in part, by light emitting elements such as an array or row 16 of LEDs. The printer 10 further includes an LED array control system 18 which is coupled to the LED array 16 to control operation of the LEDs of the LED array 16. The control system 18 is described in greater detail below in connection with FIG. 4. The printer 10 further includes a printing control system 20, which provides an interface between the computer 12 and the LED array control system 18.

The printing control system 20 includes (see FIG. 2) a micro-controller or microprocessor 22. The printing control system 20 further includes storage 24 (such as random access memory), an external I/O port 26, and firmware storage 28 coupled to the micro-controller 22 via a data bus 30. FIG. 2 also shows that the imaging assembly 14 includes a lens 32 to focus the light emitted by the LEDs of the LED array 16. The imaging assembly 14 also includes a rotatable OPC (optical photo conductor) drum 34 on which the LEDs of the LED array 16 operate.

FIG. 3 shows hardware arrangement of components included in the printer 10 and supported by a frame or housing (not shown). The OPC drum 34 is supported for rotation about an axis 36. The printer 10 includes a charging station 38 which provides an electrostatic charge to a selected area of the drum 34. The imaging assembly 14 of the printer 10 further includes a printhead 40 facing the drum 34. The printhead 40 includes the LED array 16. Exposure to light from the printhead 40 causes selected areas within the charged area of the drum 34 to be discharged. The printer 10 includes a toner dispenser 42 supported to dispense toner on the drum 34. Toner is applied to the drum 34 and adheres to the areas which are discharged and does not adhere to those areas which are charged in a write-black system. The charge on the drum repels the toner. Characters or images are constructed by charging and then darkening appropriate pixels on the drum with toner from the toner dispenser 42. The printer 10 further includes a fusing drum or fuser 44. Toner on the drum 34 is transferred and heat-fused to print media 46, such as paper, at the fuser 44. The printer 10 further includes a cleaner or cleaning station 48. The OPC surface of the drum 34 is discharged and cleaned of any remaining toner at the cleaning station 48 before being recharged.

FIG. 4 shows the LED array control system 18 and LED array 16 of the printer 10 in greater detail. The array 16 of light emitting elements includes multiple individual light emitting elements or light emitting diodes 50–57. The LEDs are arranged physically in a linear manner on a support 58 (see FIG. 3) to define the print bar or print head 40, with a sufficient number of LEDs 50–57 to achieve the desired resolution across the printed page. The printer 10 is designed such that, as media 46 is passed by the LED array 16, the appropriate LEDs 50–57 are switched on or off to produce the marks for each line to the page. Each LED 50–57 defines one pixel. According to a normal process for processing a page, software that is in charge of preparing the page determines which LEDs 50–57 need to be on or off for each line. Then, when it is time to print that line, all the LEDs 50–57 that need to be on are switched on for a period of time to produce a dot and then they would be switched back off. The printer 10 further includes a multiplexer 59 including logic gates 60–67 respectively coupled to the LEDs 50–57. The remaining electrodes of the LEDs 50–57 are coupled to power or ground. The printer 10 further includes pulse width modulators 70–76 selectively coupled to LEDs 50–57 via the multiplexer 59 and respectively coupled to ground or power (not shown).

In actual practice, even though best efforts are made to produce LEDs 50–57 having substantially identical outputs, there are usually some variations. Some of the LEDs 50–57 of the print bar 40 will produce different outputs for a given input pulse than others. This will result in some LEDs 50–57 producing charges which will attract more or less toner than other LEDs 50–57 of the print bar 40 which, in turn, will result in some printed pixels being larger or smaller than other pixels. In one embodiment, calibration is performed prior to use of the printer 10 (e.g., at the factory, prior to shipping of the printer). The relative efficiencies of the LEDs 50–57 are determined; e.g., by measuring the output produced by each LED 50–57 for a given input pulse. In one embodiment, this occurs after the LEDs 50–57 have been arranged on the support 58; however, the measurements could be made before the LEDs 50–57 are arranged on the support 58. Either the actual output (or a number representative thereof) is stored for each LED, or an amount of deviation (e.g., from an expected or average) output is stored; e.g., in storage 24 (see FIG. 2). This information is used in programming and selecting pulse width modulators 70–76 described below, in embodiments where calibration is performed. Note, however, that calibration is not performed in all embodiments.

Alternatively, or in addition, the pulse width modulators 70–76 are used to increase resolution, in a manner consistent with the methods disclosed in U.S. Pat. Nos. 5,134,495 to Frazier et al.; 5,193,008 to Frazier et al.; and 5,515,480 to Frazier, all of which are incorporated herein by reference, except that the methods are adapted for use in an LED printer instead of a laser printer. For example, enhancing the output of a 300 dot per inch printer is accomplished as follows. First, the material to be reproduced is rasterized at double the resolution of the printer; i.e. at 600×600 DPI. The pixel clock is increased to produce twice as many pixels (600 DPI) along scan lines. The increase in the pixel clock reduces the width of a full width (600 DPI) pulse to an LED, and reduces the resultant dot size, as compared with a longer 300 DPI pulse. Along the normal (300 DPI) scan lines, the 600 DPI bit map data from the pixels above and below the scan lines is used to determine which of several pulse widths are used to energize the LED at that pixel position (on the normal 300 DPI scan line); e.g. pulse widths of 0, ½, ¾, ⅞ or 1 (relative to a full-width pulse at 600 DPI), with some of the pulse widths producing energy clusters below the threshold that produces output dots. Certain interleaved dots can be produced by judicious choice of pulse widths that take into account the characteristics of a particular printer. The interleaved dots correspond to the 600 DPI bit map resolution orthogonal to the laser scanning direction; i.e. the interleaved dots are between the normal 300 DPI scan lines. Thus, a single dot may be placed between two horizontal scan lines by providing LED energizations on the scan lines at the pixel locations immediately below and immediately above the desired location, but at energy levels just below the threshold necessary to produce a dot on the major scan lines, with the overlap from the sum of the two LED impulses at the intermediate point between the two scan lines being sufficient to exceed the threshold level and to produce a dot at this point.

Note that a difference between a laser printer and an LED printer is that an LED printer includes a print bar with a plurality of LEDs. Thus, adapting the resolution enhancement concepts of the incorporated Frazier patents to an LED printer in one embodiment requires providing a separate pulse width modulator for each LED.

To reduce cost, instead of having one pulse width modulator for each LED, the number of pulse width modulators 70–76 actually used is less than the number of LEDs 50–57 of the print bar in accordance with one embodiment of the invention. The pulse width modulators are programmable. A predetermined number of pulse width modulators 70–76 are selected for use depending on the number of LEDs 50–57 in the print bar. For example, in the illustrated embodiment, sixteen pulse width modulators 70–76 are used for a print bar having two hundred and fifty six LEDs. Thus, a ratio of one pulse width modulator per sixteen LEDs is employed in the illustrated embodiment. Other ratios or numbers of LEDs or pulse width modulators are possible, such as one pulse width modulator per eight LEDs, one pulse width modulator per thirty two LEDs, one pulse width modulator per four LEDs, one pulse width modulator per two LEDs, etc. The ratio used in any particular embodiment will depend on a balancing of quality versus cost. The pulse width modulators will typically be programmed for each line such that each pulse width modulator produces a different pulse width, though other embodiments are possible.

Software in a computer or firmware in the printer is employed in the printing process to convert data from a computer program (e.g. from a word processor or other computer program that generates text or graphics or both) into binary pixel data, as is known in the art. Such conversion of data from a computer program into binary pixel data is known as rasterization. In some systems, including the system shown in FIG. 1, the computer 12 coupled to the printer 10 includes printer driver software or a RIP (raster image processor) that defines a rasterizer 13 by rasterizing input data. The raster image processor distinguishes, for example, between images and text, and uses an appropriate process to transform the input image or text into binary form suitable for printing by the print bar. The binarized data is sent directly to the print bar 40 to be printed. See U.S. Pat. No. 5,680,167 to Willis (incorporated by reference) for a discussion of raster image processing. The printer 10 itself includes a formatter (e.g., in firmware 28) that defines a rasterizer 29 which alternatively rasterizes the data; e.g., if the computer 12 does not rasterize the data.

Regardless of where the rasterization occurs, the optimal pulse width modulators to render a page are selected by the software or firmware that rasterizes the data for each line when the page is printed. The pulse width modulators 70–76 are used to compensate for differences in efficiency between the LEDs or to increase resolution using the technique described in the above-described Frazier patents, or both. Though the programming of the pulse width modulators 70–76 will take place on a line by line basis, in the illustrated embodiment, the decisions of how to program the pulse width modulators for multiple lines can be processed in advance of actual printing of a line. For example, processing for multiple pages can take place before one of the pages is printed.

During the rasterization process (see FIG. 5), assuming the predetermined number of width modulators in the printer is "x," the "x" most commonly needed different pulse widths are selected to be programmed into the available pulse width modulators for printing each line in step 80. The LEDs 50–57 requiring those pulse widths are mapped to the corresponding pulse width modulators 70–76 in step 82. The LEDs 50–57 requiring different pulse widths are mapped to one of the "x" pulse width modulators 70–76 that has a pulse width closest to the desired pulse width for that LED in step 84. Then when it is time to print, the "x" pulse codes are loaded, one pulse code per pulse width modulator, in step 88. During the print job, for each line on a line by line basis, the multiplexer 59 or similar programmable logic circuitry is used to couple each pulse width modulator 70–76 to multiple LEDs 50–57 based on the mapping, in step 90. Thus, a plurality of LEDs will receive identical pulses from a single pulse width modulator, and another plurality of LEDs will receive identical pulses from a different single pulse width modulator, etc.

Artifacts, which degrade the appearance of a printer image, can be caused by various sources. One common source is gear noise. When paper is moving through the printer, even though it seems to be moving with a smooth, fluid motion, there is actually a lot of jerkiness to it. That can cause movement of the paper and there will be places on the paper where lines may not be quite evenly spaced or may even shift side-to-side a bit.

Another cause of artifacting would be in the case of a print bar in which the LEDs are not evenly spaced, such as when an intermediate LED is closer to the adjacent LED on one side than to the LED on the other side. Such non-even spacing can inadvertently occur during the manufacturing process despite best efforts to avoid it.

To avoid this artifacting, some random noise is purposely provided, in one embodiment; e.g., in step 86. This is accomplished by using an improper pulse (i.e. by using a different pulse width modulator than would normally be used for a particular LED). This will, for example, occasionally make an LED darker or lighter than it's supposed to be, resulting in the LED producing a smaller or bigger dot. The width of a gap in a line will vary as well.

This noise is also useful in the case of less expensive, affordable LED printers of the type that are only calibrated at the factory, without capability for periodic self-recalibration, or which are not calibrated at all. The output strength of LEDs vary over time. Even though the print bar has been calibrated as best as could be at the factory to produce a consistent, even, black line from the LEDs, over a period of use, that could change so that the print bar no longer produces a consistently even black line.

The random noise hides that variation because, for a given pulse, an LED might sometimes be a little darker, or might sometimes be a little lighter, so it is not going to be off from its neighbors by the same amount every time. The noise is random meaning that it is not always applied, and is not repeatedly applied to the same pixel. Image processing techniques such as those known in digital video systems, such as television, can be employed in providing the random noise.

Although the printer shown is a grey scale printer, the invention has application to either color or grey scale printers. For a color printer, the same approach is be used, except that separate color planes have to be rendered and registered with each other, as is known in the art. For example, a color system such as described in U.S. Pat. No. 5,680,167 to Willis could be employed, and modified such that control of the LEDs for each color is in a manner similar to that described above.

The protection sought is not to be limited to the disclosed embodiments, which are given by way of example only, but instead is to be limited only by the scope of the appended claims.

What is claimed is:

1. A method of controlling light emitting elements in an electrophotographic print head, comprising:
   providing a predetermined number "x" of programmable pulse width modulators, the predetermined number being less than the number of the light emitting elements;
   during preparations for printing a line, selecting the "x" most commonly required different pulse widths for the line;
   mapping those of the light emitting elements requiring the selected pulse widths to corresponding ones of the pulse width modulators;
   mapping remaining ones of the light emitting elements to the pulse width modulators having pulse widths close to required pulse widths for those of the light emitting elements;
   programming the pulse width modulators with the most commonly required different pulse widths for the line; and
   coupling each of the programmed pulse width modulators to multiple ones of the light emitting elements based on the mappings.

2. A method in accordance with claim 1 and further comprising using a multiplexer to couple the programmed pulse width modulators to the multiple ones of the light emitting elements.

3. A method in accordance with claim 2 and further comprising introducing random noise during the mappings.

4. A method in accordance with claim 2 wherein the pulse width modulators are used to enhance resolution.

5. An electrophotographic printer configured to print lines of pixels on a print media, comprising:
   a print head having a predetermined number of light emitting elements;
   a predetermined number of pulse width modulators having different width output pulses, the predetermined number being less than the number of the light emitting elements;
   a processor configured to select which ones of the pulse width modulators should be coupled to which of the light emitting elements for each of the lines so as to compensate for variations in efficiencies between different ones of the light emitting elements; and
   a multiplexer coupled to the processor and controlled by the processor to couple the light emitting elements selected by the processor to respective ones of the pulse width modulators, the number of the light emitting elements coupled to one of the pulse width modulators being changed during use of the printer.

6. An electrophotographic printer in accordance with claim 5 wherein the light emitting elements comprise LEDs.

7. An electrophotographic printer in accordance with claim 5 wherein there are no more than one of the pulse width modulators per four of the light emitting elements.

8. An electrophotographic printer in accordance with claim 5 wherein there are no more than one of the pulse width modulators per sixteen of the light emitting elements.

9. An electrophotographic printer in accordance with claim 5 wherein the pulse width modulators are programmable.

10. A system for controlling an electrophotographic print head including a plurality of light emitting elements, the system comprising:
    a predetermined number "x" of programmable pulse width modulators, the predetermined number being less than the number of the light emitting elements;
    means for, during preparations for printing a line, selecting the "x" most commonly required different pulse widths for the line;
    means for mapping those of the light emitting elements requiring the selected pulse widths to corresponding ones of the pulse width modulators;
    means for mapping remaining ones of the light emitting elements to the pulse width modulators having pulse widths close to required pulse widths for those of the light emitting elements;
    means for programming the pulse width modulators with the most commonly required different pulse widths for the line; and
    means for coupling each of the programmed pulse width modulators to multiple ones of the light emitting elements based on the mappings.

11. A system in accordance with claim 10 and further comprising a multiplexer means for coupling the programmed pulse width modulators to the multiple ones of the light emitting elements.

12. A system in accordance with claim 10 and further comprising means for introducing random noise during the mappings.

13. A system in accordance with claim 10 and further comprising means for using the pulse width modulators to enhance resolution.

14. A system in accordance with claim 10 wherein the predetermined number of pulse width modulators comprises no more than one of the pulse width modulators per four of the light emitting elements.

15. A system in accordance with claim 10 wherein the predetermined number of pulse width modulators comprises no more than one of the pulse width modulators per sixteen of the light emitting elements.

16. A system in accordance with claim 10 and further comprising means for using the pulse width modulators to compensate for differences in efficiency between different light emitting elements.

* * * * *